Nov. 13, 1956 W. R. SEEGMILLER 2,770,769

PUSH-PULL MAGNETIC AMPLIFIER

Filed Nov. 12, 1952

Inventor:
Walter R. Seegmiller,
by Richard E. Hosley
His Attorney.

United States Patent Office 2,770,769

Patented Nov. 13, 1956

2,770,769

PUSH-PULL MAGNETIC AMPLIFIER

Walter R. Seegmiller, Scotia, N. Y., assignor to General Electric Company, a corporation of New York Application November 12, 1952, Serial No. 320,061

7 Claims. (Cl. 323—89)

My invention relates to push-pull magnetic amplifiers of the self-saturating type, and more particularly to a full wave push-pull magnetic amplifier utilizing a balanced bridge type circuit.

Regenerative or self-saturating magnetic amplifiers of high gain utilize rectifiers connected in series with the reactor windings so that the load current in these windings is unidirectional, thereby to provide self-exciting or regenerative direct current components. Such amplifiers are commonly connected in push-pull relationship by utilizing a discriminator type output circuit comprising a pair of series connected coupling resistors with their mid-point connected to the mid-point of the supply source and their electrically remote terminals connected across the load. In such a push-pull device the coupling resistors dissipate several times as much power as the permissible load, so that the theoretical efficiency is quite low, being of the order of 20%. Also, the rectifiers must be of very considerable power dissipating capacity in order to handle the large currents flowing through the reactor winding.

It is accordingly a general object of my invention to provide a new and improved high efficiency push-pull magnetic amplifier of the self-saturating type.

It is a further object of my invention to provide a new and improved, high efficiency full wave magnetic amplifier of the foregoing type.

Still another object of my invention is the provision of a new and improved, push-pull magnetic amplifier of the balanced bridge type.

In carrying out my invention in one form I utilize a pair of saturable core devices, each having a direct current saturating winding and at least one pair of reactor windings. These reactor windings I connect in bridge circuit relation, with the windings of each saturable core device in opposite arms of the bridge. The input terminals of the bridge are connected to a source of alternating electric supply through a ballast resistor, and the intermediate bridge terminals are connected to the load. Each bridge arm includes a rectifier, and all the rectifiers are similarly poled so that the bridge conducts current in only one direction between its input terminals. Preferably, the ballast resistor is chosen to consume power in an amount about equal to the power consumed in the load, so that the theoretical efficiency is 50%. A full wave circuit of this type includes a second pair of reactor windings on each saturable core device, these second pairs of windings being connected in a second bridge circuit having output terminals common with the output terminals of the first bridge circuit and having its input terminals connected through a second ballast resistor to a second and electrically isolated source of alternating electric current supply opposite in phase to the supply source for the first bridge.

Figure 1:
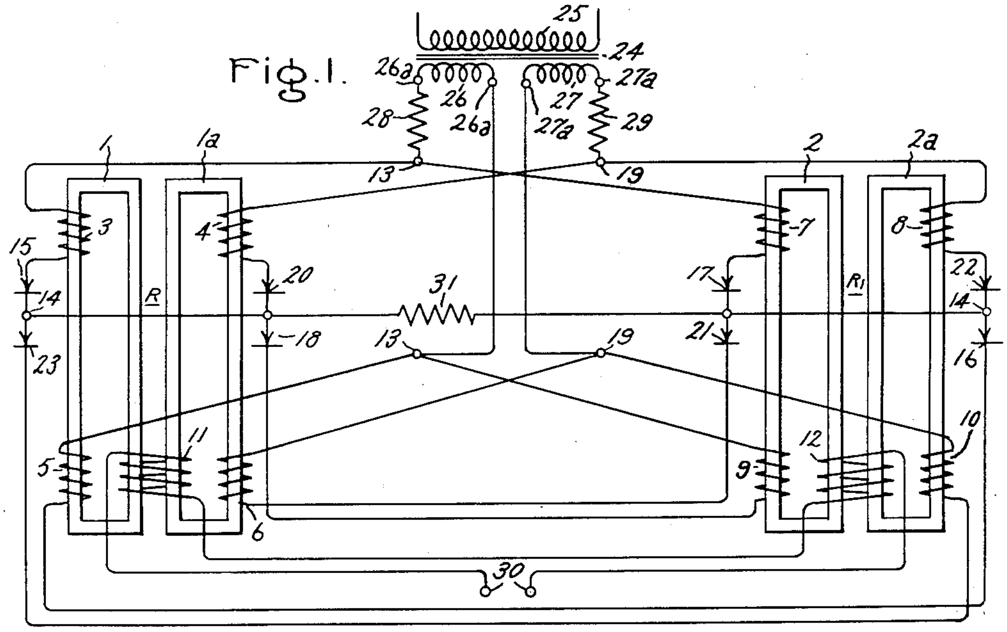
Figure 2:
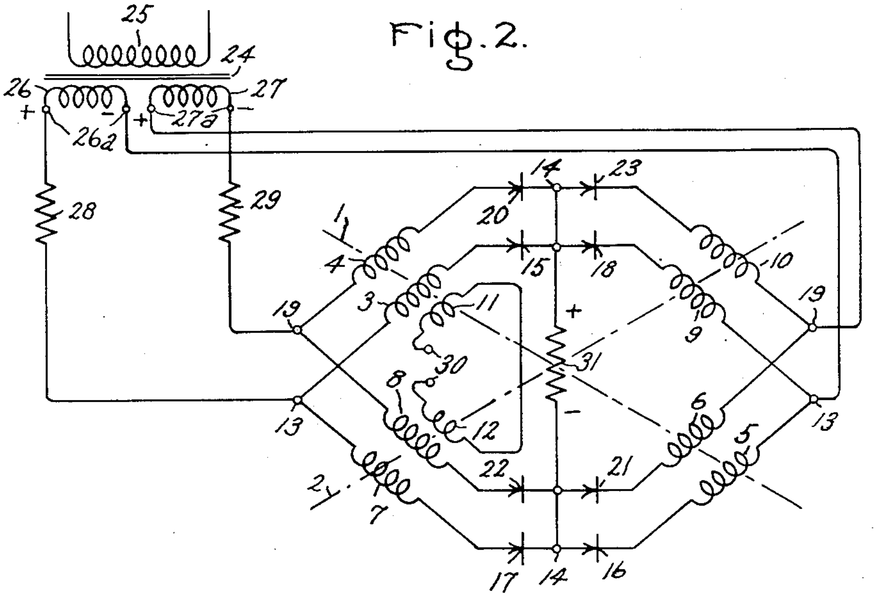

My invention itself will be more fully understood and its various objects and advantages further appreciated by referring now to the following detailed specification taken in conjunction with the accompanying drawing, in which Fig. 1 is a schematic circuit diagram of a magnetic amplifier embodying my invention, and Fig. 2 is a simplified schematic circuit diagram in which the cores of the saturable core devices are only diagrammatically indicated.

Referring now to the drawing and particularly to Fig. 1, I have shown a magnetic amplifier comprising a pair of saturable core devices R and $R_1$ each having a pair of magnetically independent saturable magnetic cores 1, 1*a*, and 2, 2*a* respectively. The device R is provided with four reactor windings 3, 4, 5 and 6, the windings 3 and 5 being on the core 1 and the windings 4 and 6 being on the core 1*a*. Similarly, the device $R_1$ and four reactor windings 7, 8, 9 and 10 with windings 7 and 9 on core 2 and windings 8 and 10 on core 2*a*. In addition, the saturable core device R is provided with a direct current saturating winding 11 linking both its cores 1 and 1*a*, and the saturable core device $R_1$ is provided with a direct current saturating winding 12 linking both its cores 2 and 2*a*.

The pair of reactor windings, 3, 5, mounted upon the core 1 is connected in bridge circuit relation with the pair of reactor windings 7, 9 mounted upon the core 2. This bridge circuit is provided with input terminals 13 and output terminals 14, thereby to form a bridge having four arms with one reactor winding in each arm so arranged that the saturable magnetic core 1 is common to one pair of opposite bridge arms and the saturable magnetic core 2 is a common to the other pair of opposite bridge arms. Each arm of the bridge includes also a rectifier connected in series circuit relation with the reactor winding included in that bridge arm. Specifically, the reactor winding 3, 5, 7 and 9 are connected, respectively, in series circuit relation with rectifiers 15, 16, 17 and 18. The rectifiers are all similarly poled in the sense that they are all connected to conduct current in one direction only between the bridge input terminals 13.

The reactor windings 4, 6, 8 and 10 on the cores 1*a* and 2*a* are similarly connected in a second bridge circuit, having input terminals 19 and output terminals 14 common with the output terminals of the first bridge. In this second bridge circuit, each arm of the bridge also includes a rectifier, the reactor windings 4, 6, 8 and 10 being connected, respectively, in series circuit relation with rectifiers 20, 21, 22, and 23. Also, in this second bridge circuit, as in the circuit first described, the reactor windings 4 and 6, which are mounted upon the core 1*a*, are in opposite arms of the bridge circuit, while the reactor windings 8 and 10, which are mounted upon the core 2*a*, are in the other pair of opposite bridge arms.

The magnetic amplifier is supplied from a source of alternating electric current supply comprising a transformer 24 having a primary winding 25 and a pair of electrically isolated secondary windings 26 and 27. The transformer secondary windings 26 and 27 provide two pairs of electrically isolated alternating current supply terminals 26*a* and 27*a*, one for each of the bridge circuits described. These two pairs of alternating current supply terminals are connected in opposite phase relation to the input terminals 13 and 19 of the two bridge circuits respectively, through ballast resistors 28 and 29, respectively, the transformer secondary winding 26 supplying the bridge input terminals 13 and the transformer secondary winding 27 supplying the bridge input terminal 19 in opposite phase relation. Between the amplifier output terminals 14 is connected a load device shown as a resistor 31.

In order to control the amplifier output by control of the saturation of the pairs of cores 1, 1*a* and 2, 2*a*, the direct current saturating windings 11 and 12 are connected in series circuit relation to a pair of direct current signal input terminals 30. The saturating windings 11 and 12 are so disposed on the pairs of cores 1, 1*a* and 2, 2a, respectively, in relation to the reactor windings on that pair of cores, that when current is flowing in one direction through the saturating windings such current aids the self-saturating current component in the reactor windings on one pair of cores and opposes the self-saturating current component in the reactor windings on the other pair of cores. When the curent in the saturating windings 11 and 12 is reversed the opposite condition prevails. Thus, with no control current in the windings 11 and 12 neither pair of cores is saturated, while control current of one polarity saturates one pair of cores only and control current of opposite polarity saturates the other pair of cores only, the instant at which such saturation occurs during each half cycle being variable, of course, in accordance with the amplitude of control current thereby to vary the amplifier output current.

The circuit shown at Fig. 2 is the same as that shown at Fig. 1, except that it has been redrawn to more clearly illustrate the bridge connection of the reactor windings, the pairs of saturable cores 1, 1a and 2, 2a, being diagrammatically illustrated by broken lines labeled 1 and 2, respectively. The circuit elements at Fig. 2 have been assigned the same reference numerals as the corresponding elements at Fig. 1.

The operation of my new and improved magnetic amplifier will be readily understood by referring now to Fig. 2. It will be recalled that the alternating current supply terminals 26a and 27a are connected to the input terminals 13 and 19, respectively, of the two bridge circuits in opposing phase relation, these bridge circuits being electrically isolated except insofar as their output terminals 14 are common. When no signal voltage is applied to the saturating windings 11 and 12, the pairs cores 1, 1a and 2, 2a are both unsaturated, so that the impedance of all four legs of both bridges is high. The rectifier impedances and the reactor winding impedances being similar, this means that the potentials at the output terminals 14 are the same and no current flows through the load 31.

If now a signal voltage of one selected polarity is applied to the saturating windings 11 and 12, the control flux established by these windings will aid the self-saturating effect of the reactor windings on reactor R and oppose saturation of reactor $R_1$. Thus, whenever reactor windings 3 to 6 are conducting the cores 1 or 1a upon which those windings are mounted will be saturated, but the cores 2, 2a will remain unsaturated. Control current of reverse polarity will saturate cores 2, 2a while cores 1, 1a remain unsaturated. It is of course well understood by those skilled in the art that by small changes in the amount of control current flowing in the windings 11 and 12, the instant during the conducting half-cycle of any reactor winding at which the associated core becomes saturated may be varied, thereby to vary over a wide range the average load current flowing through that winding. In this connection it will be understood that the impedance of any one of the bridge arms shown is relatively high when the core associated with that arm is unsaturated, while its impedance is very low, approaching zero, when the core of that arm is saturated.

It will now be observed that, in operation, when the alternating current supply terminals 26a and 27a, shown at the left side of the drawing, are positive as indicated on the drawing, the upper bridge including the reactor windings 4, 6, 8 and 10 is non-conductive while the lower bridge is conductive. Assuming, as before, that control current is flowing in the saturating windings 11 and 12 in a direction to aid the self-saturating component in the reactor windings 3 and 5 (core 1), and to oppose the self-saturating component in the reactor windings 7 and 9 (core 2), then for a variable portion of this half-cycle the reactance of the windings 3 and 5 is substantially zero, while the reactance of the windings 7 and 9 remains high during the whole half-cycle. This means that the upper output terminal 14 is brought toward the positive potential, while the lower output terminal 14 is brought toward the negative supply potential during the interval of saturation. During this interval then load current flows between the bridge terminals 13 through the reactor windings 3, the rectifier 15, the load 31, the rectifier 16 and the reactor windings 5. Since in this operation the output terminals 14 are displaced oppositely in potential from their normal equal intermediate potential, it will be evident that the bridge demonstrates the well-known push-pull mode of operation.

During the succeeding half-cycle, when the polarities of the supply terminals 26a and 27a are reversed from that indicated on the drawing, a like operation takes place by conduction between the input terminals 19 of the upper bridge, load current during this half cycle flowing through the reactor winding 4, the rectifier 20, the load 31, the rectifier 21 and the reactor winding 6 and the core 1a being saturated. It will thus be evident that the two bridge networks operate as opposite halves of a full wave rectifier, so that full wave rectified unidirectional current flows through the load 31.

It will now be further evident to those skilled in the art that if the control voltage at the terminals 30 is reversed, so that the control current in the saturating windings 11 and 12 is reversed, the cores 2 and 2a are alternately saturated while the cores 1 and 1a remain unsaturated. By this operation a full wave rectified voltage of opposite polarity is applied in push-pull relation to the load 31, and current flows in the opposite direction through the load. It will therefore be seen that by control of the polarity of the signal terminals 30 the direction of the load current may be controlled, and by small variations in the magnitude of control current large variations may be accomplished in the magnitude of load current. It will also now be evident to those skilled in the art that if the power consumption in each of the ballast resistors 28 and 29 is made equal to the power consumption in the load 31, as is preferable, the theoretical efficiency of my new and improved magnetic amplifier is 50%. This is of course a very considerable improvement over the theoretical efficiency of about 20% characteristic of push-pull magnetic amplifiers heretofore commonly used.

The function of the ballast resistors 28 and 29 may now be more fully understood by noting particularly at Fig. 2 that whenever load current is flowing through the load 31, the load, acting as a direct current source, tends to saturate the then unsaturated pair of reactor cores. For example, assume the half cycle source potentials indicated at Fig. 2 and assume also a control voltage in a direction to saturate only cores 1 and 1a so that the load voltage is in the direction indicated at Fig. 2. This unidirectional voltage across the load is in a direction which, unless compensated, would supply unidirectional current from the upper terminal 14, through the rectifier 18, the reactor winding 9, the transformer secondary winding 26, the ballast resistor 28, the reactor winding 7 and the rectifier 17 to the other load terminal 14. Considering only the direct voltage and current components in this circuit, it will be evident that the reactor windings present no appreciable impedance to such current, so that if the ballast resistor 28 were not in this circuit an appreciable unidirectional current would flow through the reactor winding 9 as a result of the load voltage. Such unidirectional current would saturate the core 2, because such current, while magnetically opposing the control current then in the saturating winding 12, the load voltage would be sufficient to overcome the control. To avoid such saturating effect from the load voltage in the circuit traced an opposing unidirectional component is interposed in the circuit by inclusion of the ballast resistor 28. The undirectional voltage component across the ballast resistor 28 is equal and opposite to the unidirectional component across the load 31 and connected in opposing series circuit relation therewith in the local circuit traced through the reactor winding 9. It will be evident to those skilled in the art that during the opposite half cycle of operation the ballast resistor 29 functions in like manner to prevent the flow of an undesired saturating current through the reactor winding 10. A like ballasting operation is performed by the resistors 28 and 29 with respect to the reactor windings 5 and 6 respectively, upon reversal of the signal voltage and consequent reversal of the load voltage. It may be now noted incidentally that under the assumed condition and at the assumed instant of operation when the load voltage tends to supply current through the winding 9 as described, such load voltage does in fact supply unidirectional current through the reactor winding 10. This current is uncompensated at the assumed instant because the ballast resistor 29 is not carrying current. Such current in winding 10 however has no effect upon the operation because winding 10 is mounted upon core 2*a* and is not in the bridge circuit which is conducting during the assumed half cycle. The reactor windings 7 and 9 in the then conducting bridge are on core 2, and this is the core which must be maintained unsaturated while core 1 saturates. On the opposite half cycle, of course, the opposite condition prevails, core 1*a* saturating and core 2*a* being maintained unsaturated by the compensating effect of ballast resistor 29.

It will now be further understood, of course, by those skilled in the art that while for the purpose of illustration I have shown only a single control saturating winding mounted upon each of the saturable core devices R and $R_1$, additional control windings for bias or other control purposes may be mounted upon cores 1, 1*a* and 2, 2*a* in a manner well-known to those skilled in the art.

Thus, while I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States:

1. A self-saturating push-pull magnetic amplifier for connection to a source of alternating electric current supply comprising a pair of direct current signal terminals, a pair of saturable reactor devices each having a pair of reactor windings and a direct current saturating winding, means connecting said reactor windings in a bridge circuit having four arms with each said pair of reactor windings in opposite arms of the bridge, said bridge having input terminals for connection to said source of alternating current supply and output terminals intermediate said input terminals for connection to a load, a rectifier connected in each arm of said bridge, said rectifiers being poled to conduct current in one direction only between said input terminals, a ballast resistor in series with said bridge input terminals and having a direct current impedance equal to the impedance of said load, and means connecting said saturating windings in series circuit relation between said signal terminals.

2. A self-saturating push-pull magnetic amplifier for connection to a source of alternating electric current supply comprising, a pair of direct current signal terminals, a pair of saturable reactor devices each having a pair of reactor windings and a direct current saturating winding, means connecting said reactor windings in a bridge circuit having four arms with each said pair of reactor windings in opposite arms of the bridge, a direct current responsive ballast resistor said bridge having input terminals connected in series with said ballast resistor for connection to said source of alternating current supply and output terminals intermediate said input terminals, a rectifier connected in each arm of said bridge, said rectifiers being poled to conduct current in one direction only between said input terminals and said bridge arms being of substantially equal impedance when said saturable reactor devices are unsaturated, and means connecting said saturating windings in series circuit relation between said signal terminals, said saturating windings being reversely magnetically poled with respect to load current flowing through said pairs of reactor windings whereby said saturable core devices are alternatively saturated as determined by the polarity of saturating current and upon saturation of one of said core devices, the other is prevented from undesired saturation by the direct current voltage drop across said ballast resistor.

3. A self-saturating push-pull magnetic amplifier for connection to a pair of alternating electric current supply terminals comprising a pair of direct current signal terminals, a pair of saturable reactor devices each having a pair of reactor windings and a direct current saturating winding, means connecting said reactor windings in a bridge circuit having four arms with each said pair of reactor windings in opposite arms of the bridge, said bridge having input terminals for connection to said alternating current supply terminals and having output terminals intermediate said input terminals for connection to a load, a rectifier connected in each arm of said bridge, said rectifiers being poled to conduct current in one direction only between said input terminals and said bridge arms being of substantially equal impedance when said saturable reactor devices are unsaturated, means including a ballast resistor connected in said bridge input terminals to said alternating current supply terminals, said ballast resistor having the same resistance as said load, and means connecting said saturating windings in series circuit relation between said signal terminals, said saturating windings being reversely magnetically poled with respect to load current flowing through said pairs of reactor windings whereby said saturable core devices are alternatively saturated as determined by the polarity of saturating current.

4. A self-saturating push-pull full wave magnetic amplifier for connection to a source of alternating electric current supply having two pairs of electrically isolated supply terminals comprising, a pair of direct current signal terminals, a pair of saturable reactor devices each having two pairs of reactor windings and a direct current saturating winding, means connecting said reactor windings in two separate bridge circuits each having four arms and each including one pair of reactor windings of each said device, said bridges having separate pairs of input terminals and common output terminals intermediate said input terminals for connection to a load, a rectifier connected in each arm of each said bridge, said rectifiers being all similarly poled to conduct current in one direction only between each said pairs of input terminals, a pair of ballast resistors each having a direct current resistance proportional to the load resistance means connecting each pair of input terminals in series with a different ballast resistor to a different pair of supply terminals in opposite phase relation with the other, and means connecting said saturating windings in series circuit relation between said signal terminals.

5. A self-saturating push-pull full wave magnetic amplifier for connection to a source of alternating electric current supply having two pairs of electrically isolated supply terminals comprising a pair of direct current signal terminals, two saturable reactor devices each having a pair of magnetically independent saturable magnetic cores and each having a pair of reactor windings mounted upon each core of the associated pair of cores and a direct current saturating winding common to said associated pair of cores, means connecting said reactor windings in two separate bridge circuits each having four arms and each including pairs of reactor windings common to one core of each of said devices, said bridges having separate pairs of input terminals and common output terminals intermediate said pairs of input terminals, a rectifier connected in each arm of each said bridge, said rectifiers being all similarly poled to conduct current in one direction only between each said pair of input terminals, means connecting said pairs of input terminals to said pairs of supply terminals in opposite phase relation, and means connecting said saturating windings in series circuit relation between said signal terminals, said saturating windings being reversely poled with respect to load current flowing through said pairs of reactor windings whereby said saturable core devices are alternatively saturated as determined by the polarity of saturating current, and a ballast resistor in series with each said bridge circuits to limit current flow through each said bridge and prevent undesired saturation of one core device when the other of said saturable core devices becomes saturated.

6. A self-saturating push-pull full wave magnetic amplifier for connection to a source of alternating electric current supply having two pairs of electrically isolated supply terminals comprising, a pair of direct current signal terminals, two saturable reactor devices each having a pair of magnetically independent saturable magnetic cores and each having a pair of reactor windings mounted on each core of the associated pair of cores and a direct current saturating winding common to said associated pair of cores, means connecting said reactor windings in two separate bridge circuits each having four arms and each including pairs of reactor windings common to one core of each of said devices, said bridges having separate pairs of input terminals and common output terminals intermediate said input terminals, a rectifier connected in each arm of each said bridge, said rectifiers being all similarly poled to conduct current in one direction only between each said pair of input terminals, a pair of ballast resistors, means connecting each said pairs of bridge input terminals to said supply terminals in opposite phase relation and in series circuit relation with a different one of said ballast resistors, and means connecting said saturating windings in series circuit relation between said signal terminals, said saturating windings being reversely magnetically poled with respect to load current flowing through said pairs of reactor windings whereby said saturable core devices are alternatively saturated as determined by the polarity of saturating current and upon saturation of one of said saturable core devices the ballast resistors prevent undesired saturation of the other of said saturable core devices.

7. A high efficiency self-saturating full wave magnetic amplifier comprising two bridge circuits having a common output for connection to a load and having separate input connections, each bridge circuit having a saturable reactor winding and a rectifier in each arm thereof with all said rectifiers in each bridge being poled in a like direction allowing current flow through each bridge in only one direction, saturating winding means magnetically coupled to all reactor windings of both bridges and adapted to alternately saturate different pairs of diagonally opposite reactor windings of both bridges together responsively to the direction of current flow therethrough, a direct current responsive ballast resistor in series with each said input connections and each ballast resistor having a direct current resistance proportional to the direct current resistance of the load, and means for enabling the input connections of said bridges to be energized by alternating currents of opposite time phase.

References Cited in the file of this patent

UNITED STATES PATENTS

| | | |
|---|---|---|
| 2,622,239 | Bracutt | Dec. 16, 1952 |

FOREIGN PATENTS

| | | |
|---|---|---|
| 233,014 | Switzerland | Oct. 2, 1944 |
| 233,962 | Switzerland | Dec. 1, 1944 |

OTHER REFERENCES

Publication—AIEE Miscellaneous paper by Geyger, #50–93, December 1949.